(12) United States Patent
Hiraishi et al.

(10) Patent No.: US 7,218,750 B1
(45) Date of Patent: May 15, 2007

(54) IMAGE PROCESSING DEVICE AND IMAGE INPUT DEVICE EQUIPPED WITH A DATA SYNTHESIZING UNIT

(75) Inventors: Junji Hiraishi, Kyoto (JP); Keitaro Taniguchi, Kyoto (JP); Takashi Kakiuchi, Kyoto (JP)

(73) Assignee: Omron Corporation, Kyoto (JP)

( * ) Notice: Subject to any disclaimer, the term of this patent is extended or adjusted under 35 U.S.C. 154(b) by 0 days.

(21) Appl. No.: 09/562,895

(22) Filed: May 1, 2000

(30) Foreign Application Priority Data

Apr. 30, 1999 (JP) ................................. 11-123528

(51) Int. Cl.
*G06K 9/00* (2006.01)

(52) U.S. Cl. ....................................................... 382/100

(58) Field of Classification Search ................ 382/100, 382/115, 119, 124, 130, 135, 137, 138, 176, 382/209, 217, 218, 219; 380/54, 55, 201, 380/203; 902/7; 713/176
See application file for complete search history.

(56) References Cited

U.S. PATENT DOCUMENTS

| | | | | |
|---|---|---|---|---|
| 5,321,773 A | * | 6/1994 | Kopec et al. ................ | 382/209 |
| 5,402,522 A | * | 3/1995 | Alkon et al. .................... | 706/26 |
| 5,465,161 A | * | 11/1995 | Funada et al. ............... | 358/438 |
| 5,533,144 A | * | 7/1996 | Fan .............................. | 382/135 |
| 5,710,834 A | * | 1/1998 | Rhoads ......................... | 382/232 |
| 5,745,597 A | * | 4/1998 | Agazzi et al. ............... | 382/182 |
| 6,154,571 A | * | 11/2000 | Cox et al. ..................... | 382/250 |
| 6,227,667 B1 | * | 5/2001 | Halldorsson et al. ........ | 351/206 |
| 6,233,684 B1 | * | 5/2001 | Stefik et al. ................. | 713/176 |
| 6,427,020 B1 | * | 7/2002 | Rhoads ......................... | 382/100 |
| 6,603,864 B1 | * | 8/2003 | Matsunoshita ............... | 382/100 |
| 6,728,883 B1 | * | 4/2004 | Kohashi et al. .............. | 713/200 |

FOREIGN PATENT DOCUMENTS

| | | |
|---|---|---|
| EP | 0 506 469 A2 | 9/1992 |
| EP | 0 535 891 A2 | 4/1993 |
| EP | 0 590 884 A2 | 4/1994 |
| EP | 0 706 283 A1 | 4/1996 |

* cited by examiner

*Primary Examiner*—Vikkram Bali
(74) *Attorney, Agent, or Firm*—Dickstein Shapiro LLP

(57) ABSTRACT

The object of this invention is to provide an image processing device and image input device which creates strong features, or enhanced pattern which could be recognized when the image was read and which would prove difficult to eliminate through subsequent image processing. When the image is generated at the later step, these features would be easily recognized by the processing according to this invention because the image is equipped with the enhanced pattern which is easy to detect. In order to achieve this object, the image processing device according to this invention is equipped with a data synthesizing unit to synthesize the clear target pattern on the candidate target pattern which is not fully clear when the recognition unit has detected a pattern similar to the target pattern.

9 Claims, 20 Drawing Sheets

Primary scanning (Scan)

Secondary scanning (Feed)

Figure 16

| AWQ 00 | AWQ 01 | AWQ 02 | AWQ 03 | AWQ 04 | AWQ 05 | AWQ 06 | AWQ 07 | AWQ 08 | AWQ 09 |
|---|---|---|---|---|---|---|---|---|---|
| AWQ 10 | AWQ 11 | AWQ 12 | AWQ 13 | AWQ 14 | AWQ 15 | AWQ 16 | AWQ 17 | AWQ 18 | AWQ 19 |
| AWQ 20 | 21 | 22 | 23 | 24 | 25 | 26 | 27 | 28 | 29 |
| AWQ 30 | 31 | 32 | 33 | 34 | 35 | 36 | 37 | 38 | 39 |
| AWQ 40 | 41 | 42 | 43 | 44 | 45 | 46 | 47 | 48 | 49 |
| AWQ 50 | 51 | 52 | 53 | 54 | 55 | 56 | 57 | 58 | 59 |
| AWQ 60 | 61 | 62 | 63 | 64 | 65 | 66 | 67 | 68 | 69 |
| AWQ 70 | 71 | 72 | 73 | 74 | 75 | 76 | 77 | 78 | 79 |
| AWQ 80 | 81 | 82 | 83 | 84 | 85 | 86 | 87 | 88 | 89 |
| AWQ 90 | 91 | 92 | 93 | 94 | 95 | 96 | 97 | 98 | 99 |

0°

W1  W2

90°

180°

AWQ64

270°

IMAGE PROCESSING DEVICE AND IMAGE INPUT DEVICE EQUIPPED WITH A DATA SYNTHESIZING UNIT

FIELD OF THE INVENTION

This invention concerns an image processing device and an image input device, which are equipped with a data synthesizing unit. More specifically, it concerns a technique to effectively prevent the output of images which may not be reproduced.

BACKGROUND OF THE INVENTION

A number of image processing systems to prevent the illegal duplication of banknotes and stock certificates have been proposed and implemented in the prior art. These approaches involve installing a device in a system which is closed from the input of the original image into the color copier until the reproduced image is generated. In this sort of closed system, the image input unit reads the original (a banknote or other document which may not legally be copied) and uses the data to verify that it may not be copied. Based on this result, output is prohibited in the image generating device.

In recent years, as image scanners, personal computers and printers have become more sophisticated and cheaper, illegal copying in open systems has become more of a social problem. An image scanner can be used to read a banknote, and the image data which it reads can be stored in a personal computer. The data can be sent from the computer to a color printer, which can then generate and print out the image. In such a case, the image data stored in the personal computer may have been sent directly in the form of signals from a scanner, or they may have been acquired off a recording medium such as a floppy disk or a magneto-optical disk. In this sort of open system, then, images are often generated from data of unknown origin. In these cases, too, some means must be provided to prevent the output of prohibited images.

The problem which arises in such cases is that the image data which arrive at the printer's image generator are not necessarily identical to those read from the original image. At the point when a decision must be made in the image generator as to whether the image it is about to output is or is not one which may not be copied, key features of the image may have already been lost.

In particular, in order to discourage tampering, the characteristic mark printed on money or stock certificates to show that they may not be copied is generally made so small that it is nearly imperceptible to the eye. If the computer processes the image to modify it slightly, there is a high probability that some of the data will be lost.

Some have proposed that the image be verified as legally reproducible in the image scanner, so that the image will not even be read if it may not be copied. However, many feel that prohibiting even the reading of the image is excessive. It is extremely difficult to come up with an absolute way to prohibit all illegal copying.

The present invention was developed in consideration of the background described above.

SUMMARY OF THE INVENTION

The object of this invention is to provide an image processing device and image input device which would solve the problems outlined above by creating strong features which could be recognized when the image was read and which would prove difficult to eliminate through subsequent image processing. When the image is generated, these features would be easily recognized by the processing according to this invention.

To accomplish the objectives outlined above, the image processing device and image input device of this invention are designed as follows. They have a unit to recognize a target pattern in the received image data (the target pattern will be recognized by image recognition unit 13 in the embodiment), and a data synthesizing unit to synthesize the clear target pattern on the recognized target pattern which is not fully clear when the recognition unit has detected a pattern similar to the target pattern (which corresponds to data synthesizing unit 14 in the embodiment). The entire device is realized as image processing device 12 in the embodiment.

When the recognition unit has found a pattern which resembles the target pattern, a set of feature data is synthesized (i.e., inserted) into the image data which were received. Thus the image data which pass through the image processing device can later be accurately recognized as the detected image based on the synthesized feature data. Then if, for example, the image data are subsequently transmitted into an open system, it will be difficult to eliminate the target pattern through image processing. Ultimately, when an image generator produces and attempts to print out the said image data, they will be accurately recognized as the detected image, and the required processing will be executed to prevent output.

A variety of features may be used for the feature data. For example, an enhanced version of the target pattern would be a suitable choice (claim 2). In this case, a pattern of the same sort as the target pattern printed on the bill which is the object of detection, but enhanced, is written into the image data. This makes it more difficult to eliminate the target pattern through subsequent image processing. Ultimately, when the image generator attempts to print out the image, the enhanced target pattern will be recognized as the object to be detected.

Even if an enhanced pattern is synthesized and imposed on top of the original target pattern, it need not be conspicuous or intrusive. Moreover, since any recognition processing executed by a latter stage device such as an image generator would be able to use basically the same algorithm as the recognition unit in the image processing device, this method has an obvious advantage. A different recognition algorithm could, of course, also be used.

Another example of appropriate feature data would be digital data such as an electronic watermark (claim 3). If an electronic watermark is synthesized in the image data, the subsequent recognition processing could consist of detecting the said watermark. Such a watermark could be detected with greater accuracy than other types of feature data. Moreover, if invisible data such as an electronic watermark are written in, the presence of the mark would not be detectable during normal use.

The image input device of this invention has any one of the image processing devices disclosed in claims 1 through 3. The image input device has the recognition unit execute the recognition processing on the image data which it acquires. The image data synthesized by the synthesizing device become the output data of the image input device (claim 4).

If this method is used, when a document (a banknote, say) is submitted to the image input device to be read, the read-in processing per se will be executed. When the data are read in, new image data consisting of synthesized (i.e., inserted) feature data are generated and output. These synthesized feature data guarantee that when the user eventually attempts to print out the image, the mark will be detected accurately, and the specified processing will be executed to prohibit output.

An "image input device" according to this invention includes not only a scanner with an image sensor as discussed in the embodiment, but also transmission and signal communication devices which exchange image data with other devices.

BRIEF DESCRIPTION OF THE DRAWINGS

FIG. 16 illustrates the principle underlying the organization of the output of the window element.

FIG. 21 (*b*) shows an enhanced version of the detected pattern.

FIG. 22 (*b*) shows an enhanced version of the detected mark.

DETAILED DESCRIPTION OF THE INVENTION

Figure 1:
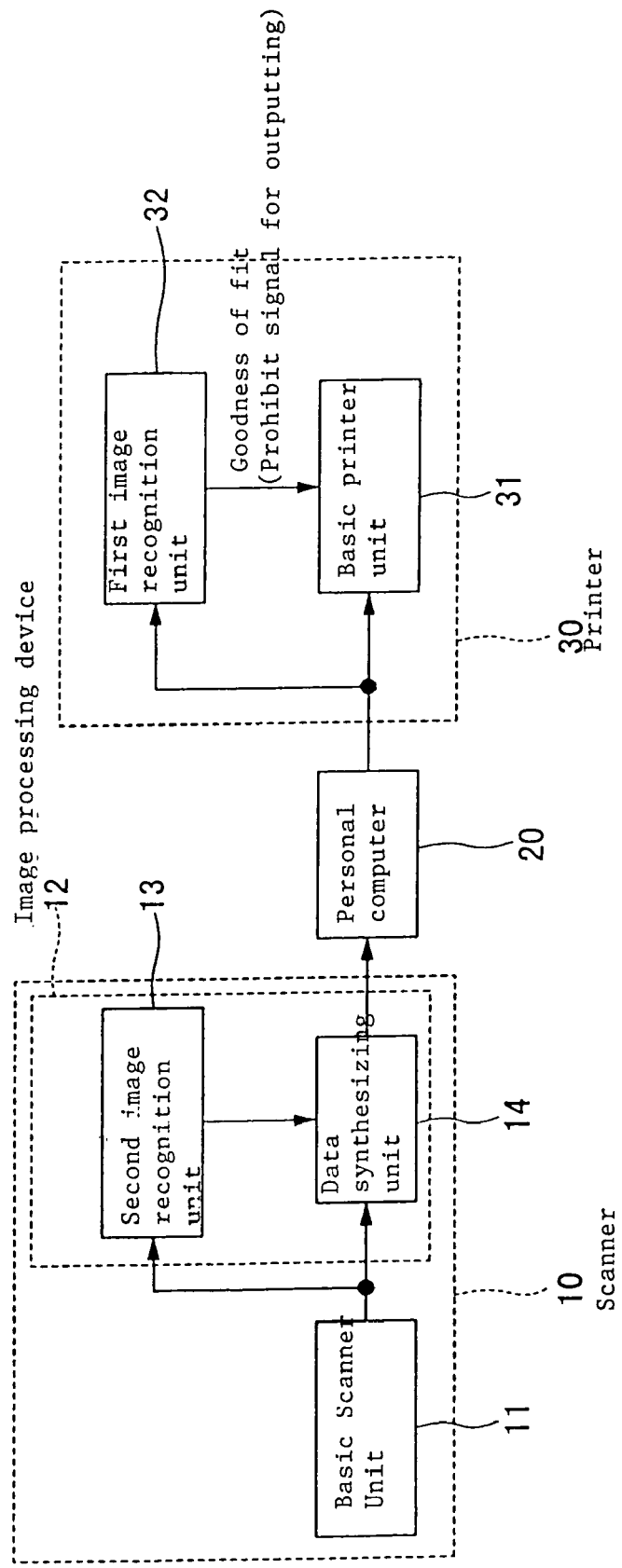
FIG. 1 shows the overall configuration of the image processing device according to this invention.

FIG. 1 shows the basic configuration of an image processing system in which the present invention has been implemented. As can be seen in the figure, the document which is to be read is imaged by scanner 10 and taken in as image data. The image data which are taken in are transmitted to personal computer 20 and stored in either computer 20's internal memory or in an external storage device. At the time the data are taken in or after they are read out of the storage device, an application installed in personal computer 20 which can process image data executes the specified image processing or modification processing. The image data are then output to an image generating device such as printer 30, which prints the image on paper.

This configuration is well known in the prior art. Scanner 10 and personal computer 20 may be connected directly via a cable, or data may be transmitted between them via a communication circuit. The image data read by scanner 10 may be stored in personal computer 20 via a storage medium such as a floppy disk or a magneto-optical disk.

Printer 30, which must prevent the final output of the copy of the banknote or other item which may not be reproduced (i.e., may not be output) consists of printer 31, which performs the function of a printer, and image recognition unit 32. Recognition unit 32 executes the specified processing on the image data it receives from personal computer 20. It obtains the goodness of fit, which indicates how similar the found pattern is to the one which is printed on non-reproducible items, and it sends this goodness of fit to printer 31.

If the goodness of fit which it receives is above a given threshold, printer 31 determines that the image data it has been asked to output represent a non-reproducible item, and it executes the specified processing to prohibit output. This processing may result in printing the entire page a given color, printing the word "warning" in overlapping rows across the page, or cutting off the power supply so that the output processing itself is prohibited.

Alternatively, instead of outputting the goodness of fit, as in the previous example, image recognition unit 32 can take the process all the way through to determining whether output should be prohibited based on the goodness of fit. If it determines that the image in question may not be output, it outputs a "prohibit output" command. A third alternative would be that the image recognition unit 32 and printer 31 be related in the same way as the recognition unit and copying unit in a prior art copy machine.

With this invention, in addition to basic scanner unit 11, which fulfills the same function as a prior art scanner, scanner 10, the image input device, has the image processing device 12 of the first embodiment as the image processing proposed by this invention. Image processing device 12 has a recognition unit 13, which executes the processing to detect a target pattern in the image data, and a data synthesizing unit 14, which synthesizes data to enhance the target pattern in the image data captured by scanner unit 11 when recognition unit 13 has detected a pattern resembling the target pattern.

With this method, if a target pattern is detected as the image is being input or read in, data entry is allowed to continue, but data are synthesized to enhance the target pattern. This insures that the pattern will not be eliminated by any subsequent image processing. When a printer is eventually asked to output the image, recognition unit 32 will be certain to recognize the target pattern and prohibit output because of the enhanced target pattern. The pattern may be enhanced by increasing the density of the corresponding pixels or synthesizing a new perfect target pattern with no flaws.

Before explaining the detailed processing in data synthesizing unit 14, we will now explain the detailed method to detect and recognized the target pattern.

Figure 2:
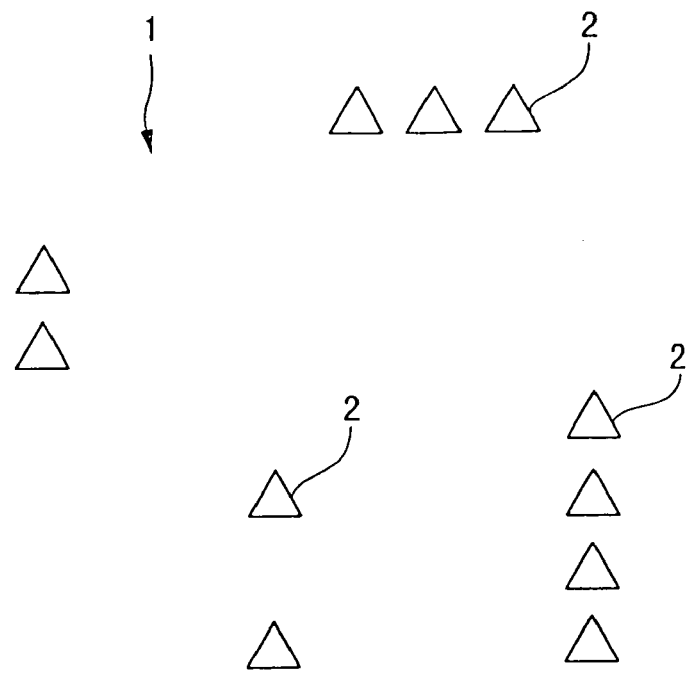
FIG. 2 shows an example of marks and a pattern which might be used in this invention.

In this embodiment, a target pattern 1 such as that shown in FIG. 2 is provided in a given location on the document to be detected, which is something that may not legally be copied or output. A determination is made as to whether target pattern 1 can be found in image data which is under image processing by a printer and other image creating devices. If it can be found, a signal to prohibit outputting the image data of the document is output according to this invention.

Figure 3:
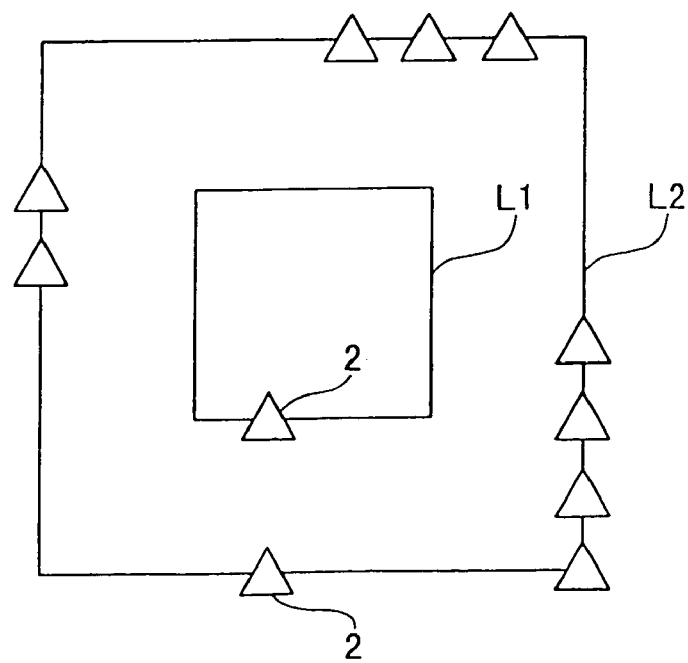
FIG. 3 illustrates the principle by which the marks used in this invention are arranged.

Target pattern 1 is composed of a number of marks 2 which are placed in appropriate locations. In this embodiment, marks 2 are small triangles which form the shape of a frame with nothing in the center. These triangles are of a specified color. The principle underlying the arrangement of marks 2 in this example is shown in FIG. 3. The marks are placed along the sides of two squares. In the example shown, there is a single mark 2 in a specified location on $L_1$, the line defining the inner square, and ten marks 2 in specified locations on $L_2$, the line defining the outer square. When marks 2 are placed along the sides of squares (or rectangles) in this way, pattern 1 can be printed so that the sides of the square are parallel to the horizontal and vertical axes of the image. The marks will then correspond to the scanning path when the image is read, which will simplify the detection hardware by allowing a smaller window to be used. When pattern 1 is actually printed, of course, lines $L_1$ and $L_2$ will not be there, and only the marks 2 shown in FIG. 2 will be visible. This will make it difficult for an uninformed person to figure out the principle of the arrangement and so make it more difficult to tamper with the pattern.

According to this invention, all of marks 2 are formed using a given color, as discussed above. The marks may be of identical or similar colors. The color is one with a high density (numerical value of the color signal is large) in one of the three color signals expressing the color data in an RGB or other format. If the given color is yellow, the signal value of one signal is large even when the color signals are expressed by RGB, Lab, or YMC. In other word, B is larger than others in case of RGB, b in case of Lab, and Y in case of YMC. This color choice of yellow makes it easier to detect the shape of the target pattern, and the yellow target pattern is not easy to detect by the human naked eyes.

We will now explain how to recognize or detect the target pattern according to the embodiment of this invention. Target pattern 1 is composed of a number of marks 2. The first step is to detect these marks 2 in the image and determine their locations. The color of marks 2 is selected to the specific color which gives the large contrast, or different in a color component signal. The density of one of the three color component signals constituting the marks, therefore, will be higher than that of the other two. By executing threshold processing in the image signals with respect to this color component signal and binarizing the image data, we can extract marks 2 and recognize the pattern.

In this embodiment, we can achieve greater accuracy of detecting the marks by extracting the pixels constituting marks 2. In addition to pattern recognition based on a single color component signal, we can determine whether each pixel in the mark has a given color component density. When a single color component signal is subjected to threshold processing independently of the other signals, it is possible for wrong color (i.e., a color different from the color of the marks) with a density above the threshold to be extracted as well. For this reason, the image data obtained are filtered with respect to the density of the three color component signals. By extracting pixels whose density is within a given range, we can extract only pixels of the desired color.

We can execute pattern shape recognition using a single color component signal and then determine whether the pattern is the specified color. By finding the logical sum (AND) of these two processes, we can accurately extract just the pixels constituting the marks. This concludes the detection process of the marks.

We next obtain the locations of the marks we have extracted. By determining whether they are in a given spatial relationship with each other, we can find how closely they resemble the specified target pattern (i.e., their goodness of fit). Since the marks 2 which constitute pattern 1 in the example shown in FIG. 2 are placed on the outlines of two squares, two windows can be set up which correspond to these squares. We could then determine whether, for example, the marks 2 found in these windows while scanning in the raster direction are in a given spatial relationship with each other.

Figure 4:
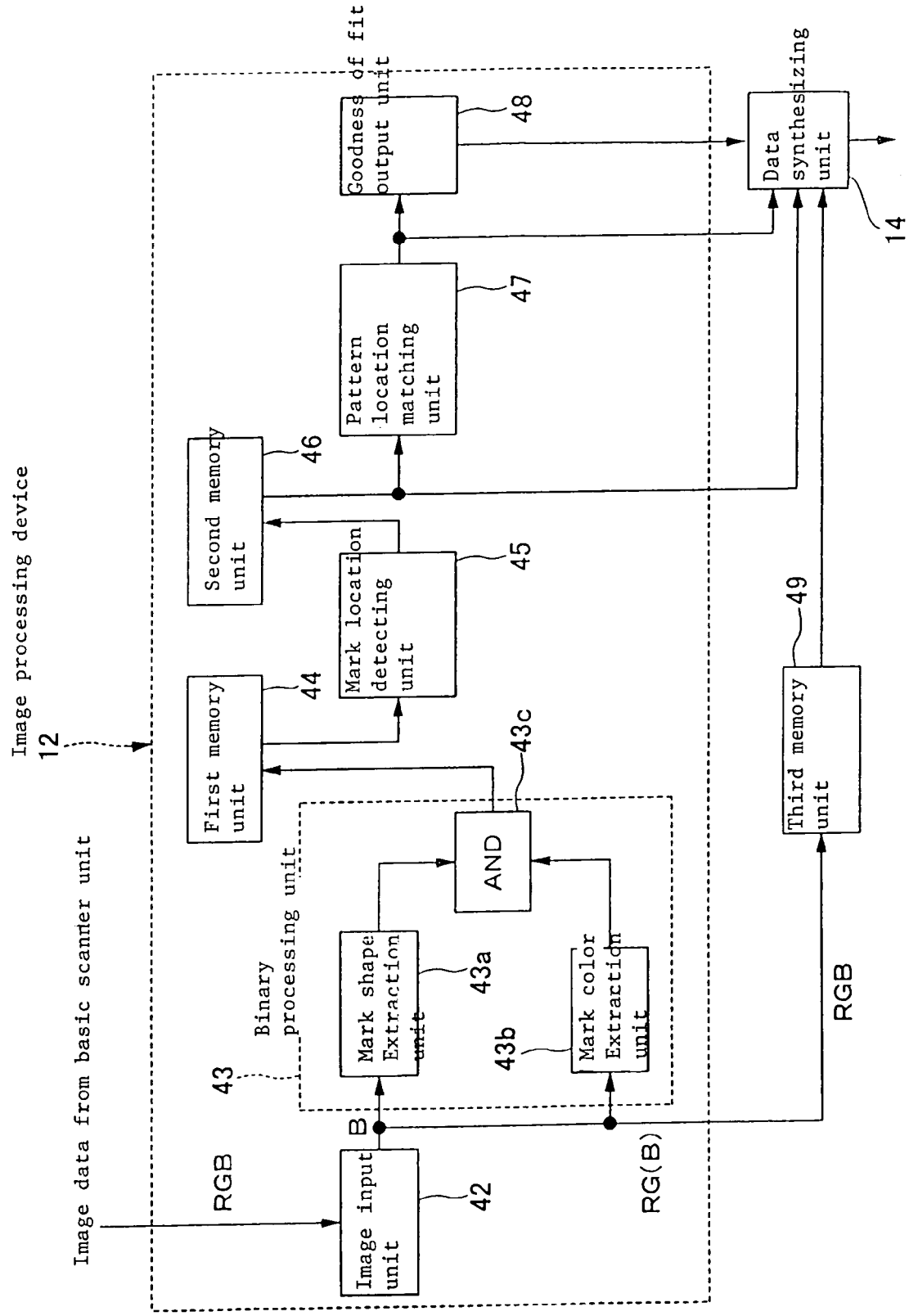
FIG. 4 shows the overall configuration of a preferred embodiment of the image processing device according to this invention.

We shall next discuss an embodiment of the image processing device of this invention which is ideally suited for implementing the processing method described above. FIG. 4 shows the overall configuration of such an image processing device. In this example, the image processing device according to this invention is installed in a image input device such as a scanner, which allows to receive the prohibited image to copy (such as banknote) but does not allow to output the received image as it is, In other words, the image processing device according to this invention will modify the received image so that it can not be printed out.

As can be seen in FIG. 4, the image data read by the image sensor in the copy machine are transmitted to image processing device 12 (a buffer IC) in image input device 10. As these image data are scanned by an image sensor such as a CCD, they are transmitted successively in real time, region by region, to the image processing device. The actual data which are sent are 8-bit color data for each of the red (R), green (G) and blue (B) components.

The RGB color signals pass through image input unit 42 and are transmitted to binary processing unit 43. The binarized image data (i.e., a binary image) are stored in first memory unit 44. The binary image stored in unit 44 is sent to mark location detection unit 45. The marks 2 constituting target pattern 1 are extracted from the binary image, their locations are specified, and they are stored in second memory unit 46. Everything before unit 46 constitutes the mark detecting unit to detect the marks.

The data representing the locations of marks 2 which are stored in second memory unit 46 are transmitted to pattern location matching unit 47. A window of a specified shape and size is used to determine how well the locations of the marks match a specified arrangement (i.e., the arrangement constituting pattern 1 (see FIG. 2). The result of matching level of the marks is transmitted to goodness output unit 48. Goodness output unit 48 will calculate the goodness of fit of the received pattern based on the number of the pixels which are matched with the predetermined arrangement, and the goodness of fit will be forwarded to data synthesizing unit 14.

Data synthesizing unit 14 judges if the target pattern should be synthesized or not based on the goodness of fit outputted from goodness of fit unit 48. If yes, the target pattern 1 is synthesized on the received pattern stored in third memory unit 49 using the patter location data outputted from pattern location matching unit 47, the angle of rotation, and mark location data outputted from mark location detecting unit 45 (stored in second memory unit 46).

Third memory unit 49 is used to hold the received pattern temporary during the time delay while the image data are processed in first memory unit 44, and second memory unit 44. The received pattern is directly from the image input unit 42. In FIG. 1, the outputted image from scanner 11 is directly inputted to data synthesizing unit 14 for the purpose of showing in the drawing and the explanation of the invention. It is, however, necessary in an actual configuration that the received image (the outputted image from the scanner 11) is stored in third memory unit 49 for synchronizing with marks location data outputted from to second memory unit 46, and pattern location data outputted from pattern location matching unit 47, all of which are inputted to data synthesizing unit 14. It is, of course, possible to input the received image directly to data synthesizing unit 14.

As mentioned above, since the target pattern is preferably yellow, it is hardly recognized by the human naked eyes. It gives, therefore, only little influence to the synthesized pattern even after the synthesizing the target patter on the received pattern. It is not synthesizing the target pattern on other pattern, but on the pattern which was originally identical to the target pattern. Because of this reason, the synthesizing the target pattern makes further little changes on the received pattern which no body can recognize the synthesizing.

The example shown is the configuration when the target pattern is yellow. It is, however, no problem if the target pattern is different color from yellow if one of the color components forming the color has a distinct difference from other color components. It is because it is easy to detect the marks using the one color component. The selected color can be the color which is easy to recognize, because the target pattern is synthesized on the original pattern, which does not give any effects to the human naked eyes.

Because of the synthesizing, the next image processing device and the image generating device which are connected to the image processing device according to this invention can recognized the synthesized target pattern easily, and the pattern recognition can be performed without fails.

We shall next discuss the detailed function and configuration of each unit of the image processing device according to this invention. Binary processing unit 43 comprises mark shape extraction unit 43a, mark color extraction unit 43b and AND element 43c, which finds the logical sum (AND circuit) of the outputs of units 43a and 43b. A single color component signal with a high density, whichever of the RGB signals is best suited to extracting the mark, is sent to mark shape extraction unit 43a. The other color component signals, or, alternatively, all the color component signals, are sent to mark color extraction unit 43b. The marks we detected in this example are yellow, so the B signals are sent to mark shape extraction unit 43a.

Figure 5:
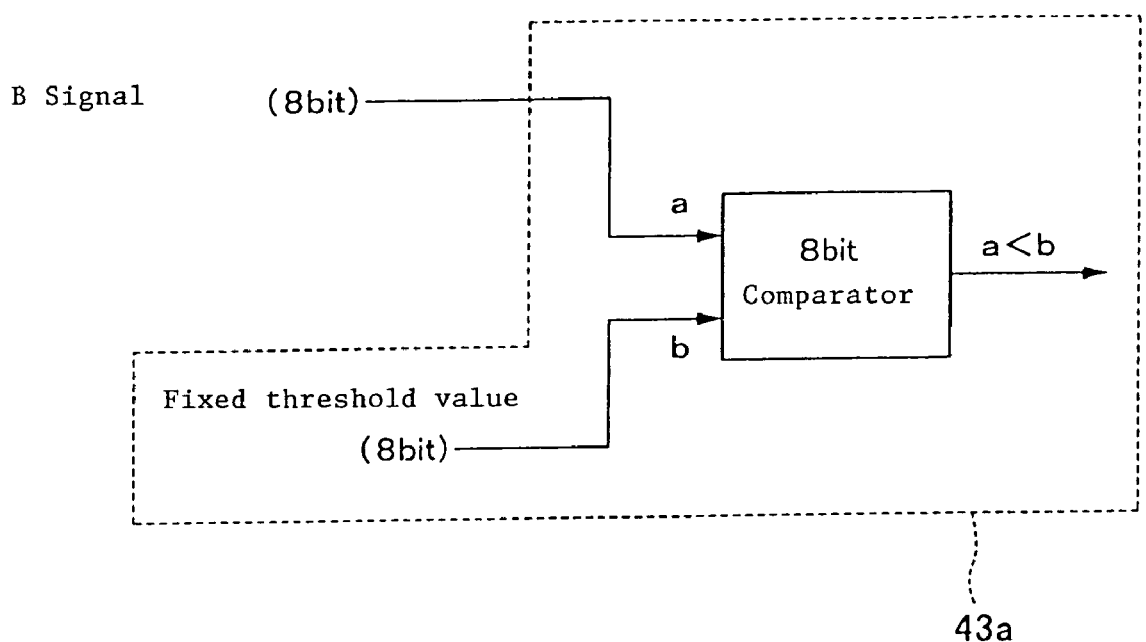
FIG. 5 shows the internal configuration of the mark shape extraction unit.

Mark shape extraction unit 43a, shown in FIG. 5, executes threshold processing. It has a comparator with eight bits to match the eight bits constituting the color component signals. The B signal received from image input unit 42 is input into input terminal a; a fixed threshold value is input into input terminal b. When a is less than b, the output will be "1". (The higher the density, the lower the numerical value.)

In this embodiment, the threshold value is fixed. The use of a floating binary circuit would allow the threshold value to be changed according to the density of the document. Such a configuration would yield a more accurate pattern. In mark shape extraction unit 43a, 8 bits type is used for the high accuracy, but a fewer bits type can be used as long as the accuracy can be maintained. In this example, B color component corresponding to yellow is used, but other color component can be also used according to the selection of the mark color.

Figure 6:
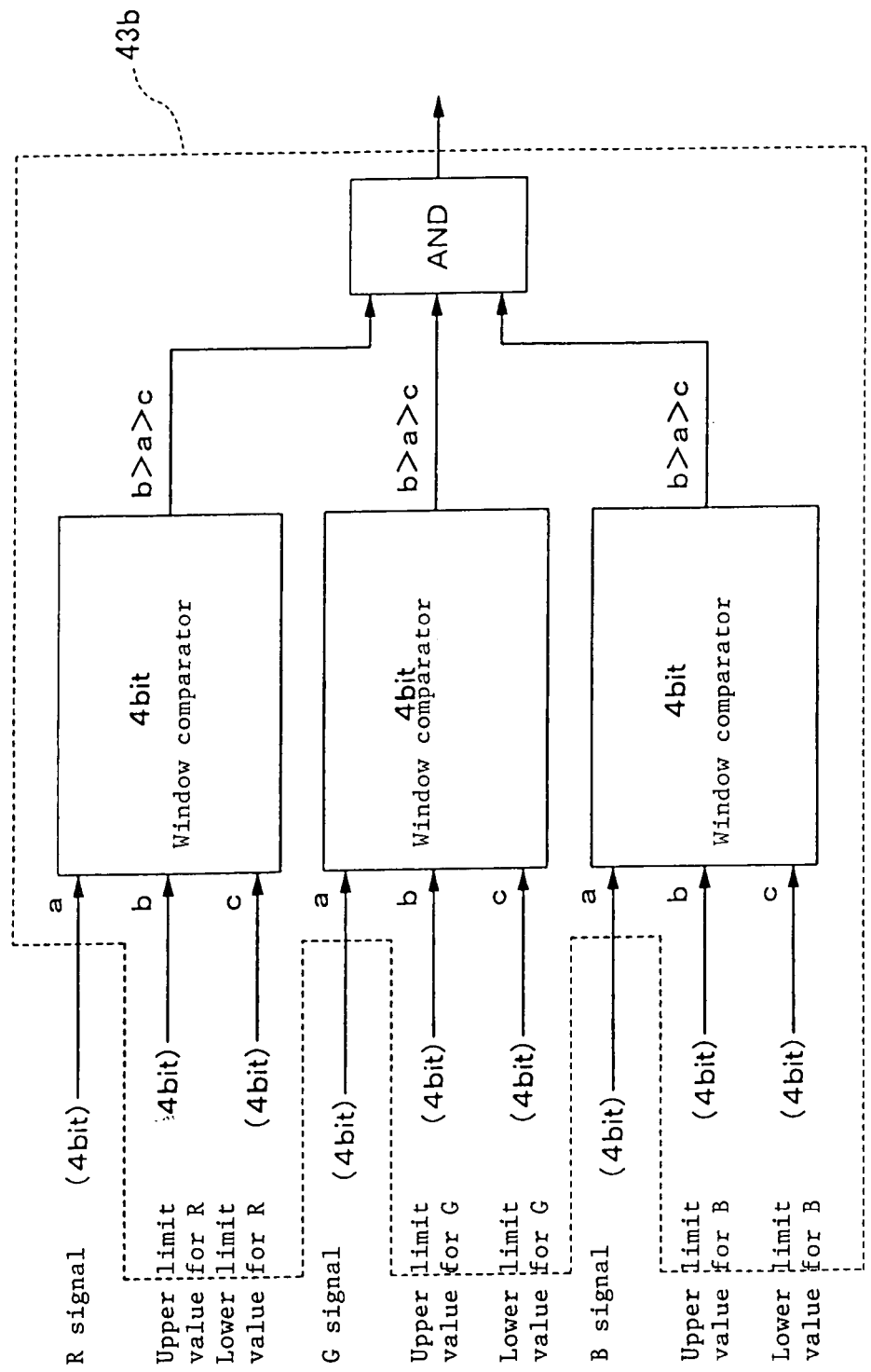
FIG. 6 shows the internal configuration of the color extraction unit.

Processing each RGB signal, mark color extraction unit 43b, shown in FIG. 6, extracts any pixel whose density falls within a fixed range (between an upper and a lower limit value). Unit 13b consists of three 4-bit window comparators which input RGB signals one by one and compare them with upper and lower limit values (when b>a>c, the output will be "1") and a three-output AND element which finds the logical product of the outputs of the three comparators. The upper and lower limit values used by the comparators have a specified margin with respect to the RGB signal expressing the color of the marks 2 which are to be detected. When a pixel is found for which each of the R, G and B components has a density within the fixed range, the output of the AND element will go to "1", and the pixel will be extracted as a prospective constituent of a mark.

Mark color extraction unit 43b uses a 4-bit window comparator because printed materials in general suffer from extreme non-uniformity (variation) of color. Higher color resolution would be pointless. However, as pattern recognition requires accuracy, mark shape extraction unit 43a uses an 8-bit comparator, as mentioned above. Separating pattern recognition from color extraction in this way allows us to extract the mark accurately and absorb errors due to variation among the colors constituting the mark so that the mark can be specified correctly.

A binary processing unit 43 configured as described above outputs a binary image in which pixels which are the same color as mark 2 are expressed as "1" and pixels of other colors are expressed as "0". This image is stored in first memory unit 44, which in this embodiment consists of a given number of line buffers. Mark location detection unit 45 can use the binary image to detect marks 2 and extract their locations. Once the locations of the marks are known, there is no need to store all the image data representing the document. Only a few dozen lines of buffer space are needed to store the data needed for subsequent processing.

Figure 7:
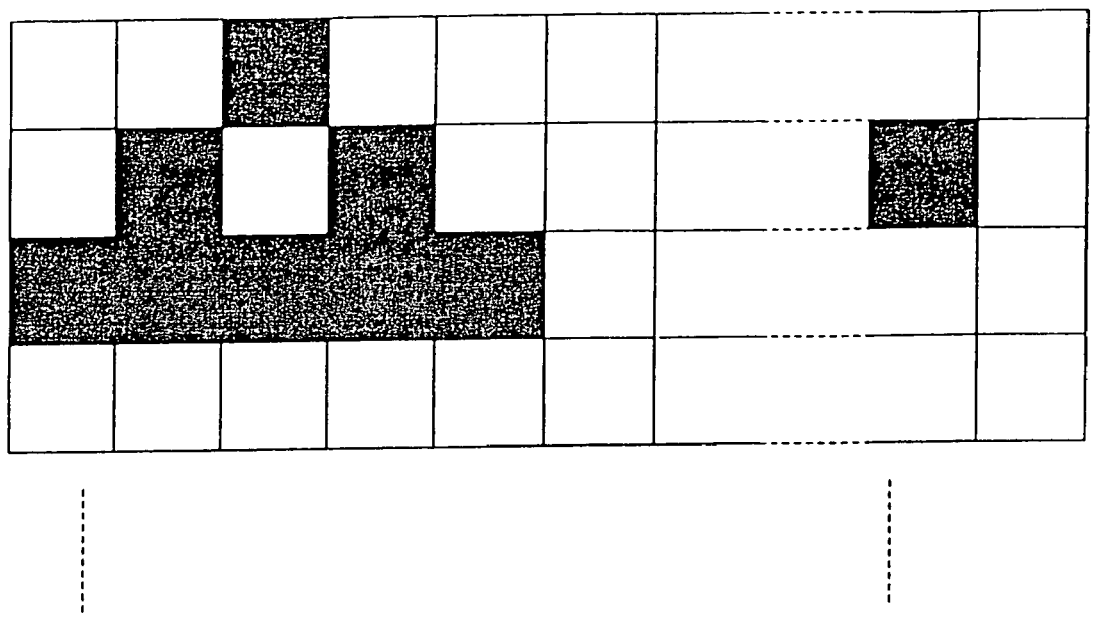
FIG. 7 shows an example of a pattern which might be stored in first memory unit.

An example of a binary image which would be stored in first memory unit 44 (the line buffer) is shown in FIG. 7. Each square in the drawing represents one pixel. In the example we have been using, marks 2 are triangles. In order to make them distinguishable from dirt smudges, we have left them white in the center. The mark shown in FIG. 7 is a minimal triangle. In this embodiment, the marks have been made as small as possible to enable the hardware needed to detect them to be made smaller as well as to make it more difficult for an uninformed person to find them. The mark of pixels which constitutes the actual mark is that shown in FIG. 7.

Mark location detection unit 45 reads out the data stored in first memory unit 44 and detects the marks of pixels which constitute triangles like the one shown in FIG. 7. In this example, it uses a window of 5×4 pixels ($Q_{00}$ through $Q_{34}$) like that shown in FIG. 8. When the binary data for pixels $Q_{02}$, $Q_{11}$, $Q_{13}$ and $Q_{20}$ through $Q_{24}$ are "1" and those for the other pixels are "0", the HIT output goes to "1", and the location data are stored in second memory unit 46.

Figure 8:
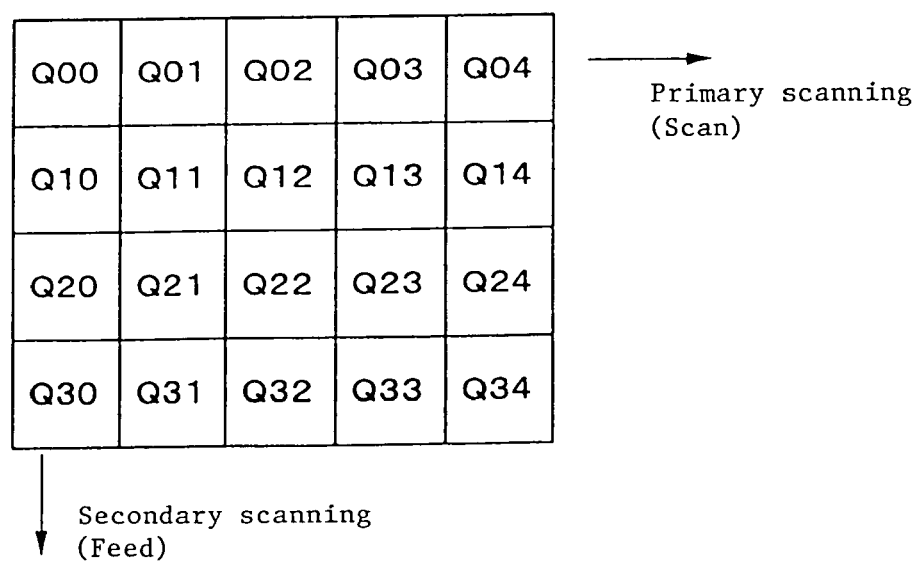
FIG. 8 shows the window used in the pattern location detection unit.

Since the mark 2 is rotated in an actual case, a plurality of mask data shown in FIG. 8 are prepared along with the rotation angle. The location data and the rotation angle data are stored in second memory unit 46. If the mark is a circle, the musk data and the rotation angle data are not necessary. In FIG. 8, the mask has 4×5 size, but the 5×5 size can be used for detecting the detailed location of the top portion of the triangle.

The result of this detection (mark has been found: 1; no mark has been found: 0) is stored in second memory unit 46. In this embodiment, a location data of the central white portion within the triangle will be used to represent the window. If necessary, shrunk window such as 2×2, or 4×4 can be used which is a gradated data. This gradated data does not seriously affect to detect the target pattern at pattern location matching unit 47, because the received pattern 1 is much larger than the individual mark 2, so gradated mark data will be sufficient for the relatively large received pattern.

Figure 9:
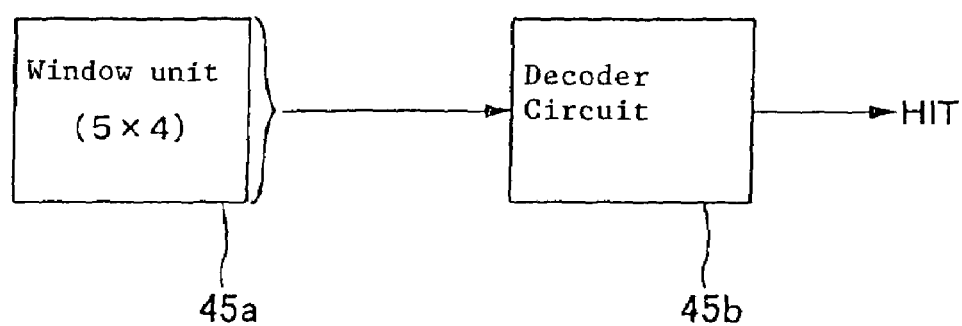
FIG. 9 shows the internal configuration of the pattern location detection unit.

Mark location detection unit 45, which executes the processing discussed above, is shown in FIG. 9. Unit 45 comprises window unit 45a, which measures 5×4 pixels, and decoder circuit 45b, which receives the pixel data (1/0) detected by unit 45a and determines whether they are in a given arrangement.

Figure 10:
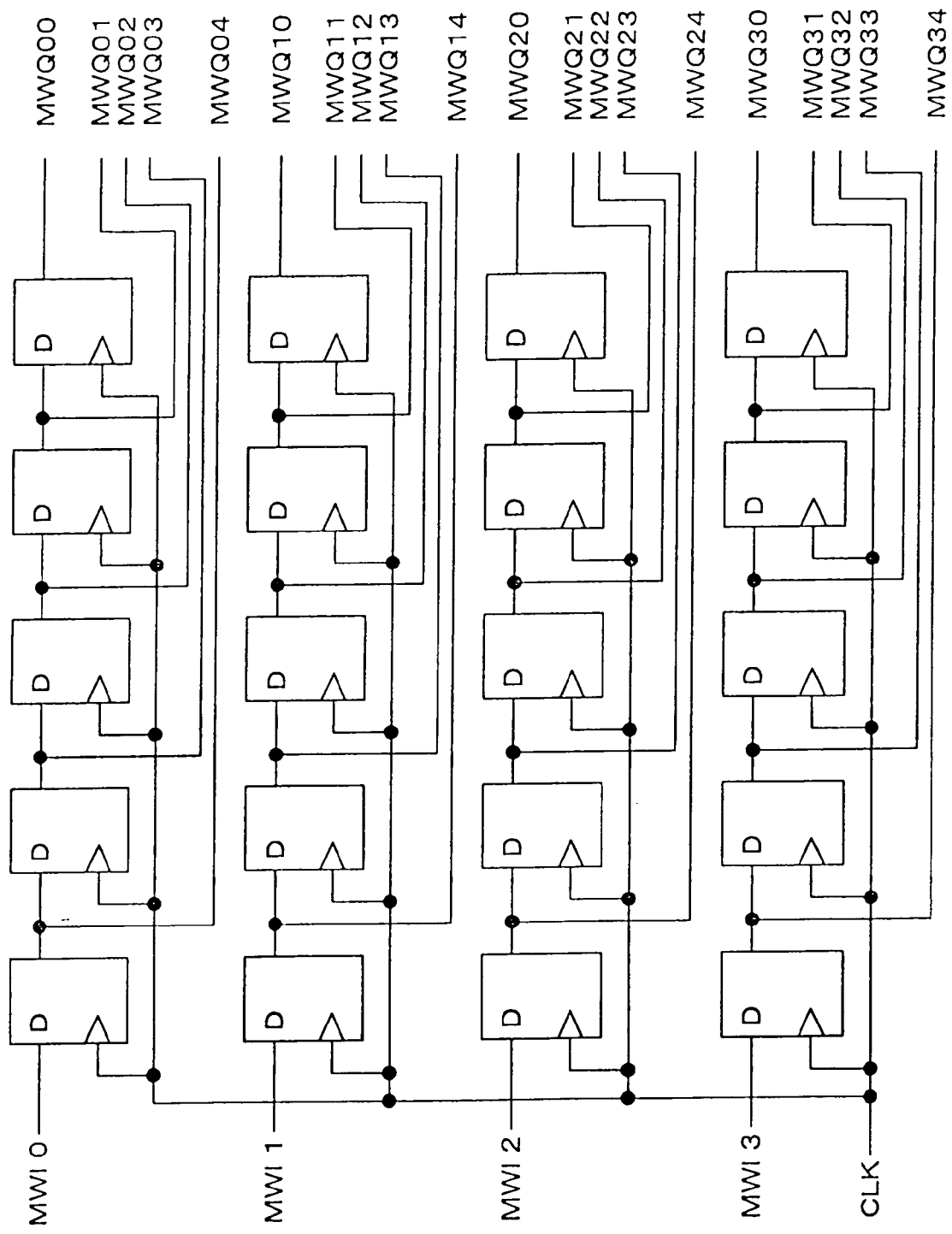
FIG. 10 shows an example of a window which might be used in the pattern location detection unit.

More specifically, as is shown in FIG. 10, each $Q_{ij}$ in the window consists of a flip-flop. The window has four rows in each of which five flip-flops are connected in series. A row of flip-flops corresponds to the pixel data (1/0) stored on a single line in the line buffer which serves as first memory unit 44. The data are input into the flip-flops, starting with the head flip-flop, in order from the first pixel. Each flip-flop simultaneously receives a clock (CLK) signal. Once synchronized, it transmits the data to the next flip-flop.

When clock signals are input one by one, the input of data to the flip-flops assumes the same form as scanning pixel by pixel in the scanning direction. When the final pixel data for a given line (1/0) have been input, we begin to input data to the head flip-flop of the next line down. This is identical to moving down one pixel in the feed direction. Consequently, the output of the flip-flops when five pixels' worth of data have been input will be as shown in the drawing and will be equivalent to the window pictured in FIG. 8. The output $MWQ_{ij}$ (i=0 through 3, j=0 through 4) of each flip-flop is sent to decoder circuit 45b.

Figure 11:
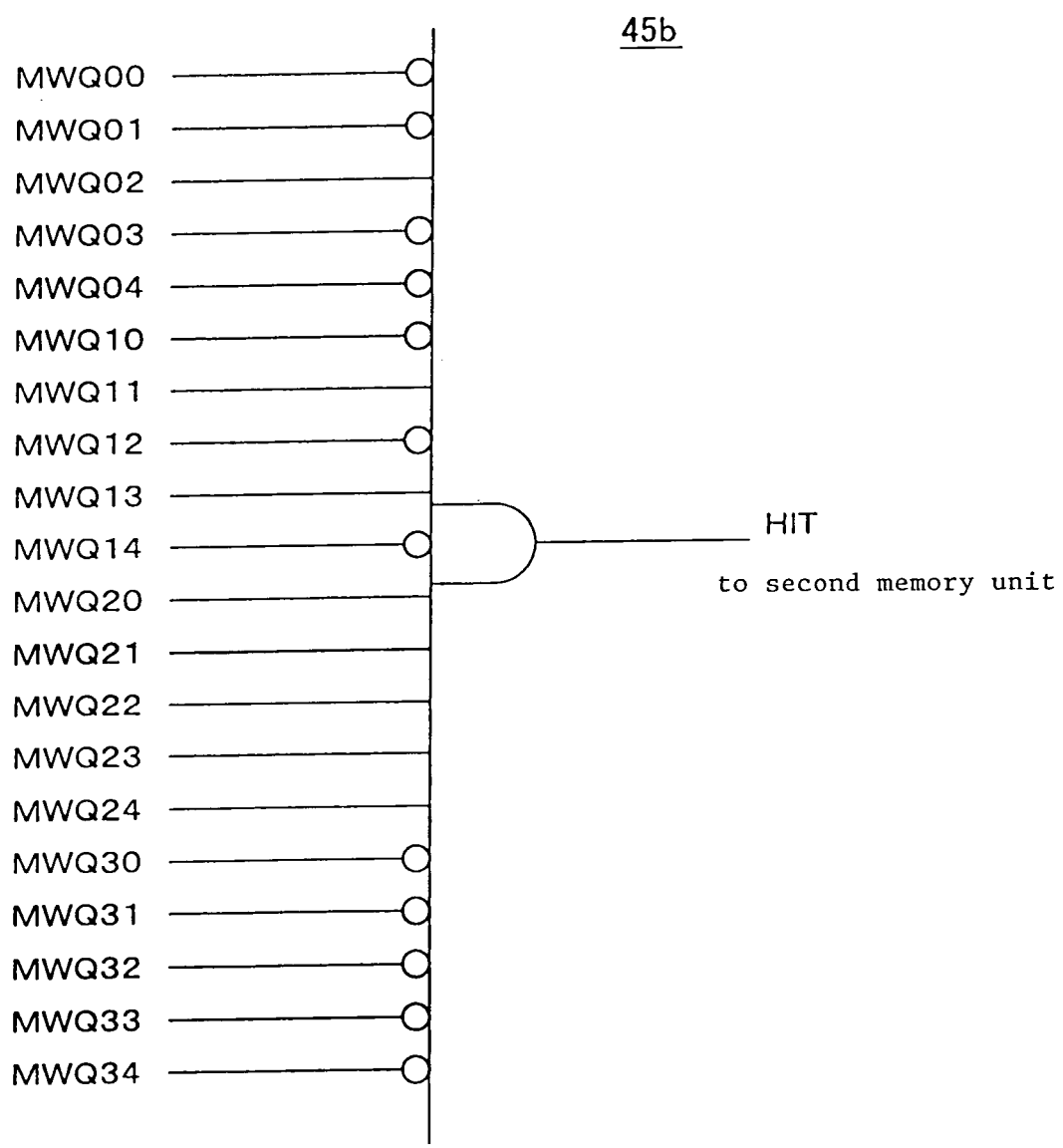
FIG. 11 shows an example of a decoder circuit which might be used in the pattern location detection unit.

Decoder circuit 45b, which is pictured in FIG. 11, comprises a 20-input AND element. When a mark is input, the input terminals constituting white pixels have their input reversed. Thus when black pixels "1" are lined up in a given shape, all the inputs of the AND element which constitutes the decoder circuit go to "1", and the HIT output of the decoder circuit goes to "1". If the value of a single pixel is different from the that of the others, one of the inputs to the AND circuit will be "0", and the HIT output of the decoder circuit will go to "0". Based on the output of decoder circuit 45b, data representing the locations of all the valid marks 2 are stored in second memory unit 46.

Figure 12:
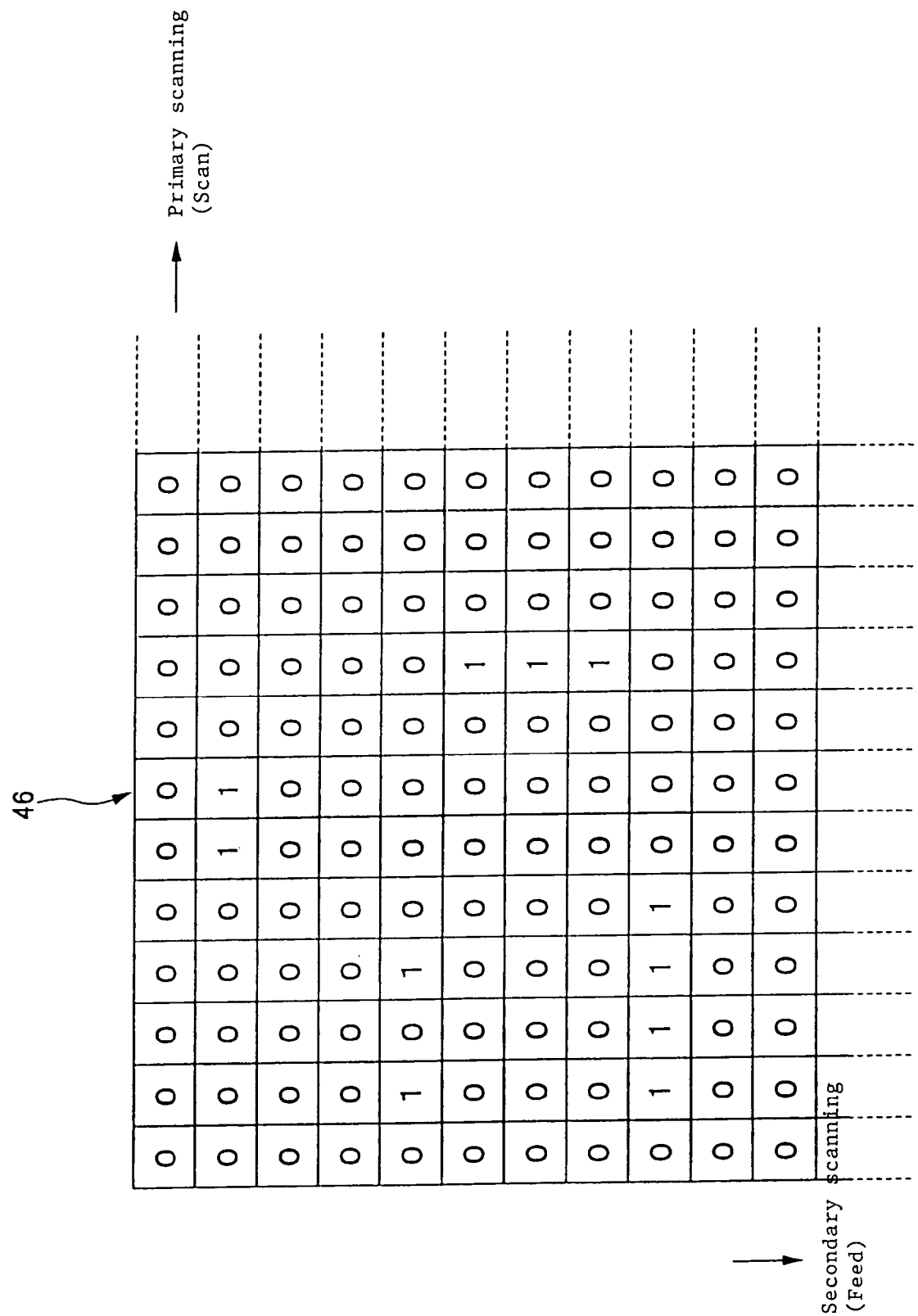
FIG. 12 illustrates how the data are stored in second memory unit 16.

If we are to map out the internal data stored in second memory unit 46 when the pattern has been detected, they would be arranged as shown in FIG. 12. Each square in the drawing corresponds to a 5×4 pixel chunk of the image data captured when the document is imaged.

As stated above, mark location detection unit 45 outputs a compressed binary image in which portions where marks 2 are found go to "1" and pixels of other colors are expressed as "0". This image is stored in second memory unit 46, which in this embodiment also comprises a given number of line buffers. Since the target pattern is detected based on this compressed binary image, there is no need to store all the image data representing the document. Only a few dozen lines of buffer space are needed to store the data needed for subsequent processing.

Figure 13:
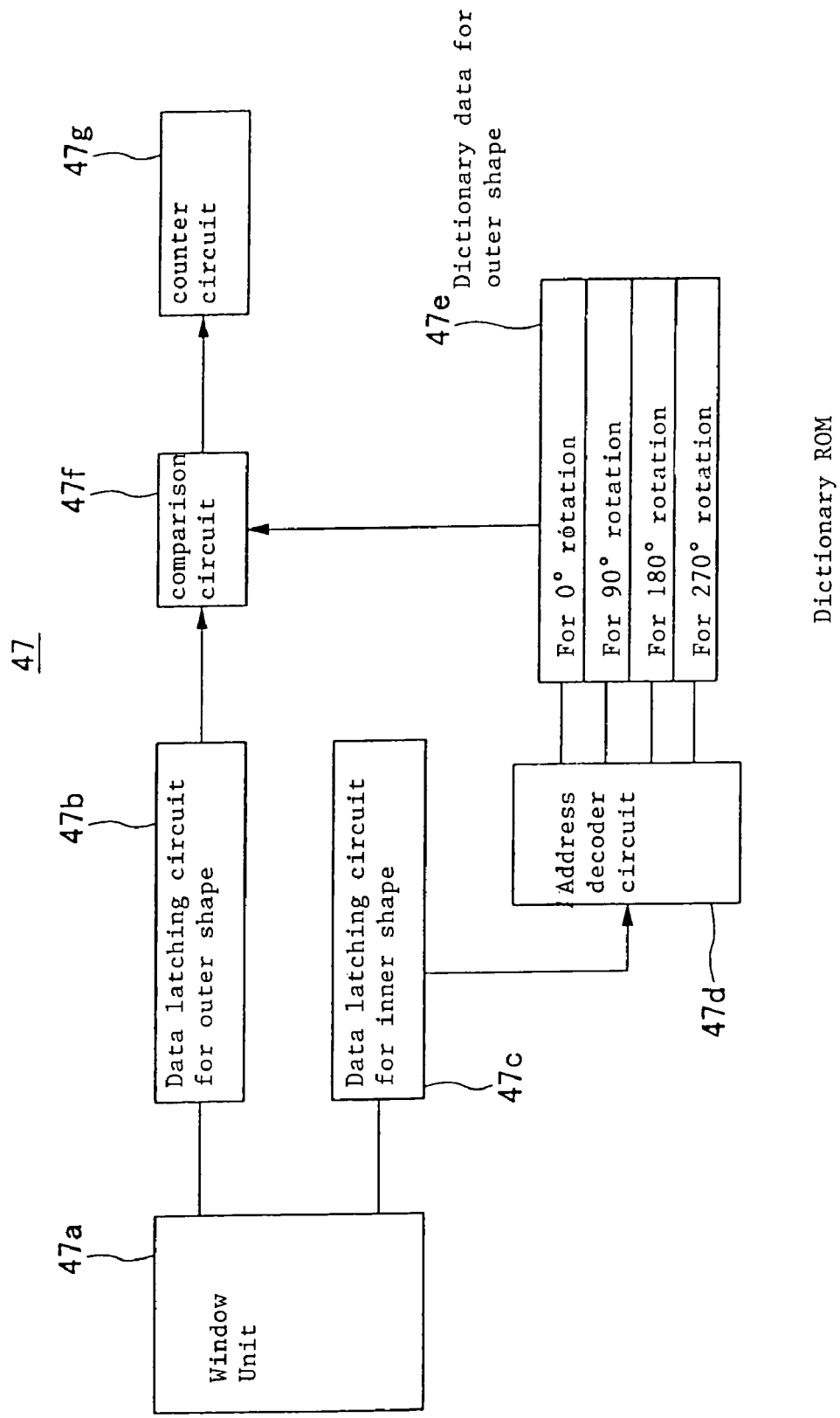
FIG. 13 shows the internal configuration of the pattern location matching unit.

Pattern location matching unit 47, which detects target pattern 1, is configured as shown in FIG. 13. It has a window 47a of a given size, which it uses to scan the mark data (1/0) stored in second memory unit 46.

In this example, target pattern 1 comprises a number of marks 2 placed along the outlines of two squares, as shown in FIGS. 1 and 2. For this reason it is desirable to extract simultaneously all the "1"s stored in second memory unit 46, which can be seen in FIG. 12.

Figure 14:
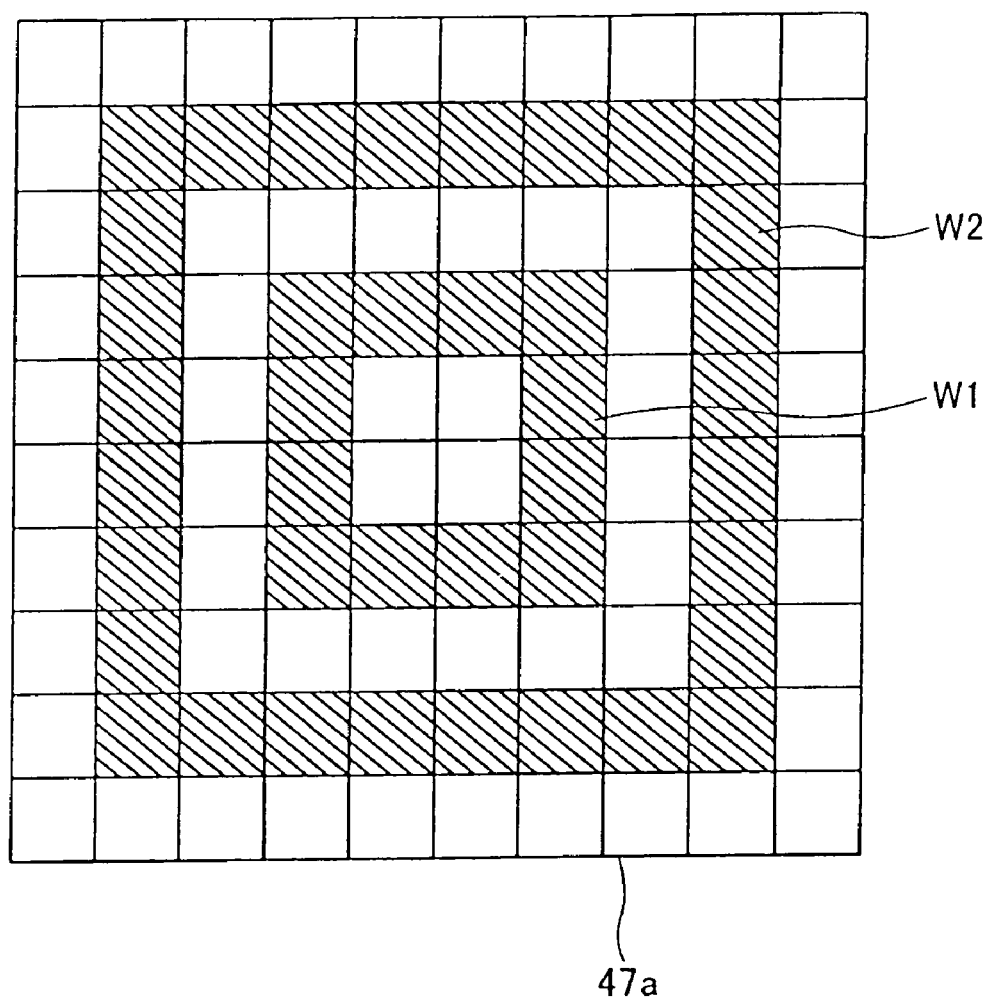
FIG. 14 illustrates the concept used in the window element of the pattern location matching unit.

Leaving a margin one chunk wide around the outer square on which the marks are placed, we use a window of 10×10 chunks, as shown in FIG. 14. The hatched portions of the drawing (inner square $W_1$ and outer square $W_2$) are the regions where data will actually be collected.

Figure 15:
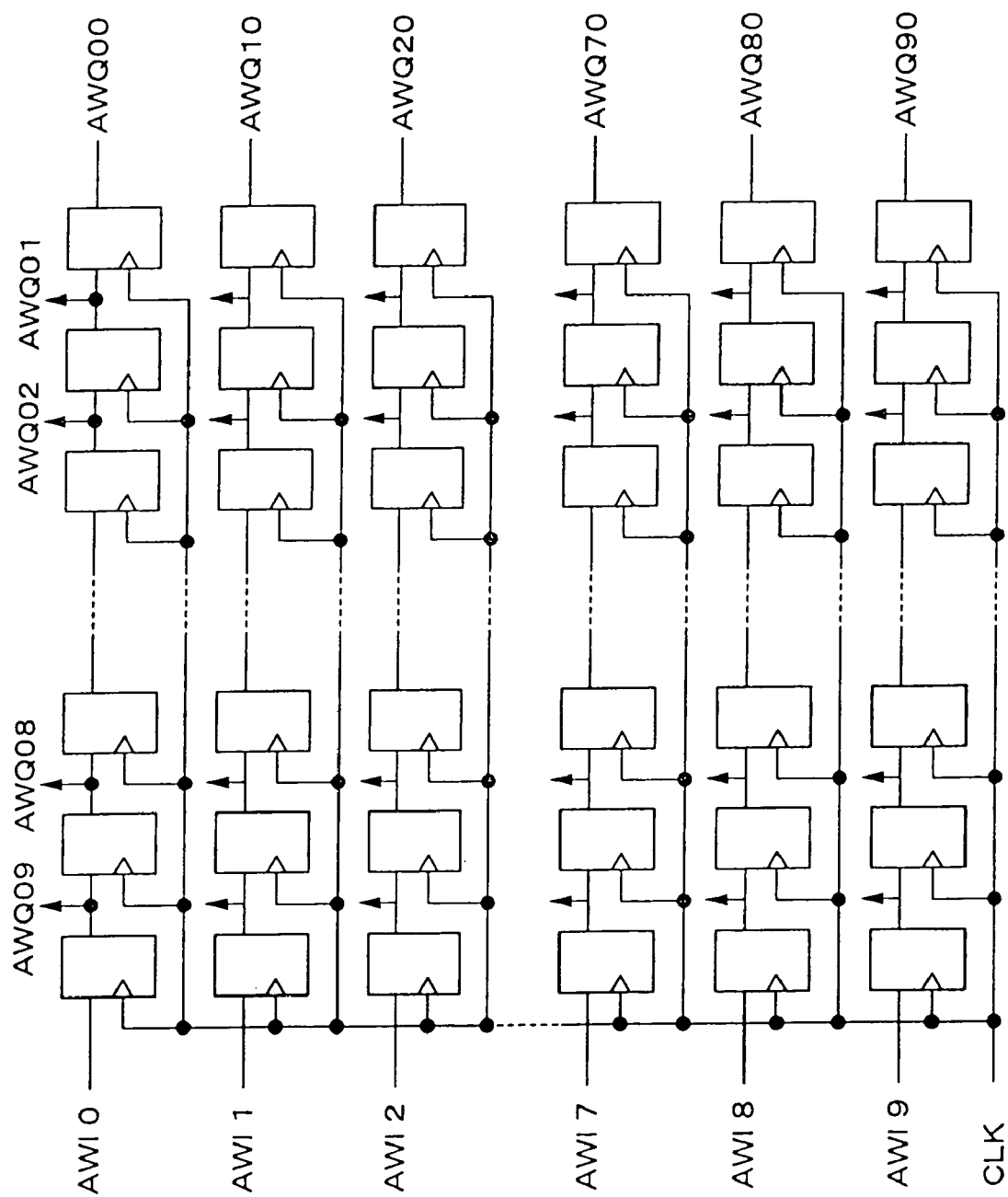
FIG. 15 shows the actual hardware constituting the window element.

The actual configuration of window unit 17a is shown in FIG. 15. Ten rows of flip-flops with ten serial inputs and parallel outputs are provided. Data in a given line buffer of second memory unit 46 are input into the corresponding row of flip-flops in order starting with the head flip-flop. The operation is identical to that of the aforementioned 5×4 pixel window unit 45a in mark location detection unit 45. Data synchronized by a clock signal CLK are transmitted in order. The output of the flip-flops at any given moment, as shown in FIG. 16, functions as a 10×10 unit window.

The units in the output which correspond to the hatched portions of FIG. 14 are AWQ33 through 36, 43, 46, 53, 56 and 63 through 66 (inner square $W_1$) and AWQ11 through 18, 21, 28, 31, 38, 41, 48, 51, 58, 61, 68, 71, 78 and 81 through 88 (outer square $W_2$). These data can be used to detect target pattern 1.

The data stored in the units of outer square $W_2$ (the outputs of the specified flip-flops stated above) are sent to latching circuit 47b; those stored in the units of inner square $W_1$ (the outputs of the specified flip-flops stated above) are sent to latching circuit 47c. These circuits latch to conform to the working of window unit 47a.

Figure 17:
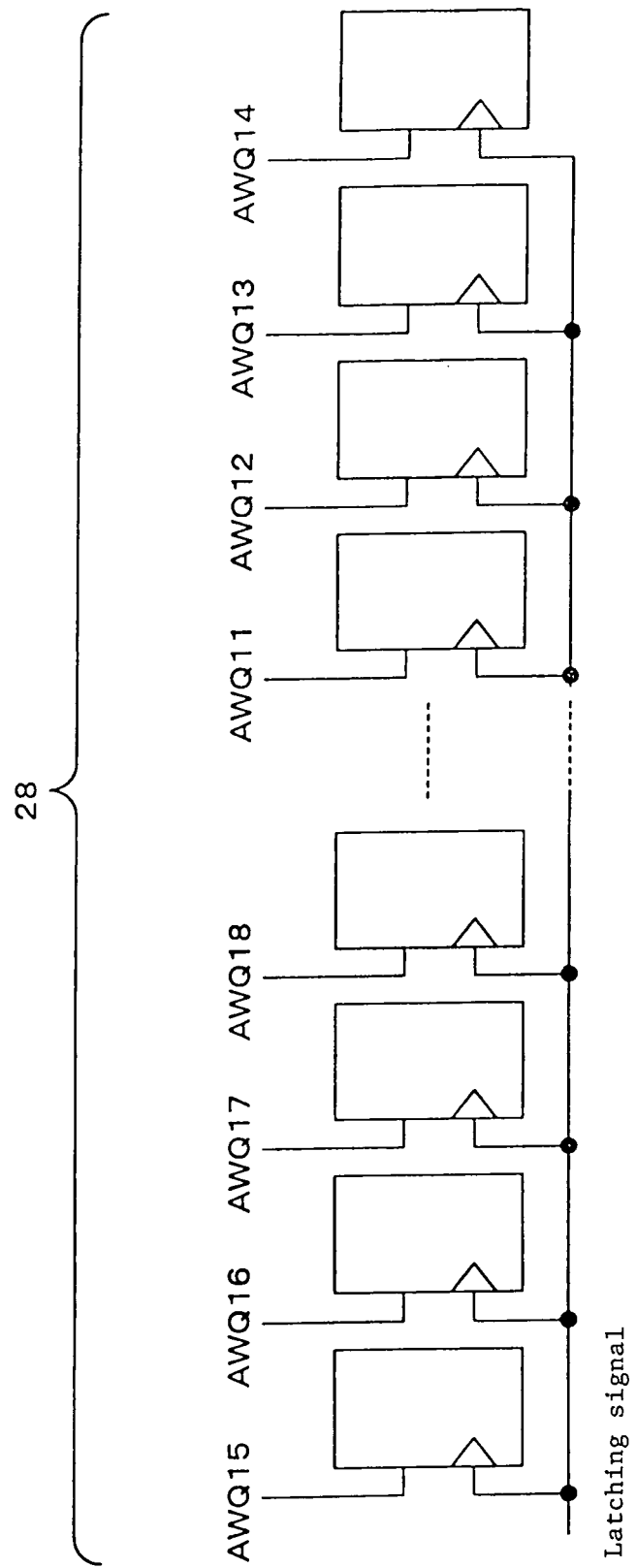
FIG. 17 shows an example of the data latching circuit used to compare the marks on the outer squares. This circuit is a component of the pattern location matching unit.

Latching circuit 47b comprises 28 D latches (flip-flop groups with parallel input and parallel output), as shown in FIG. 17. These latches maintain the input data as they are when the latch signal is received. In this example, AWQ15 is the head of the unit outputs constituting the window in FIG. 16. The units which correspond to the location of outer square $W_2$ are arranged in order in a clockwise circuit. Accordingly, as is shown in FIG. 17, AWQ15 is input to the head D latch and AWQ14 is input to the final D latch.

Figure 18:
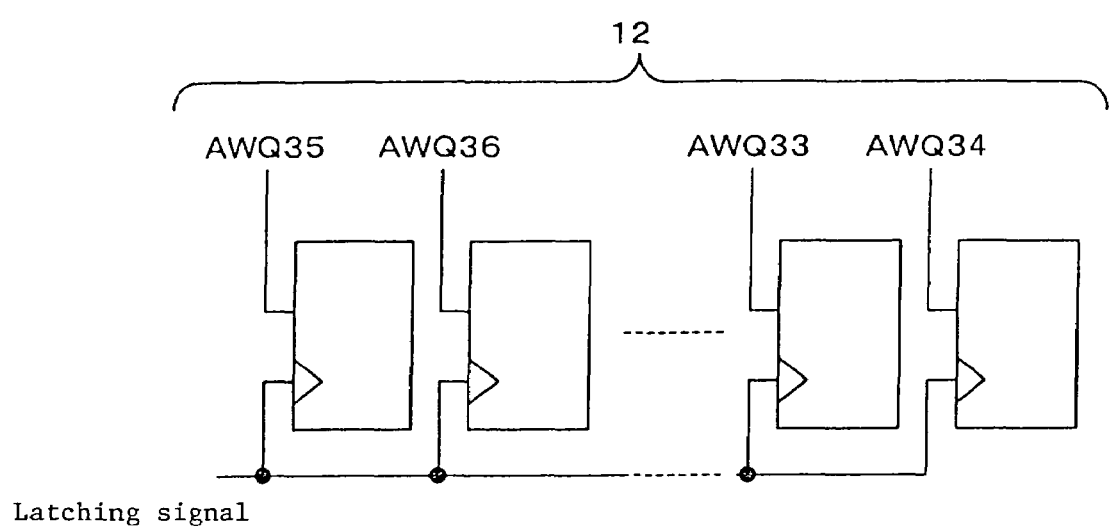
FIG. 18 shows an example of the data latching circuit used to compare the marks on the inner squares. This circuit is a component of the pattern location matching unit.

Similarly, latching circuit 47c comprises 12 D latches as shown in FIG. 18. AWQ35 is the head of the unit outputs constituting the window in FIG. 16. The units which correspond to the location of inner square $W_1$ are arranged in order in a clockwise circuit. AWQ34 is input to the final D latch.

As is shown in FIG. 13, the output of latching circuit 47c is sent to address decoder circuit 47d. The 12-bit data latched in circuit 47c are used as address data to access the corresponding portion of dictionary storage unit 47e. Dictionary data for 0 deg., 90 deg., 180 deg. or 270 deg. on the outer square are output to comparison circuit 47f. The 28-bit data latched in latching circuit 47b are sent to comparison circuit 47f, where the data are compared bit by bit. The result, match or no match, is transmitted to counter circuit 47g.

Figure 19:
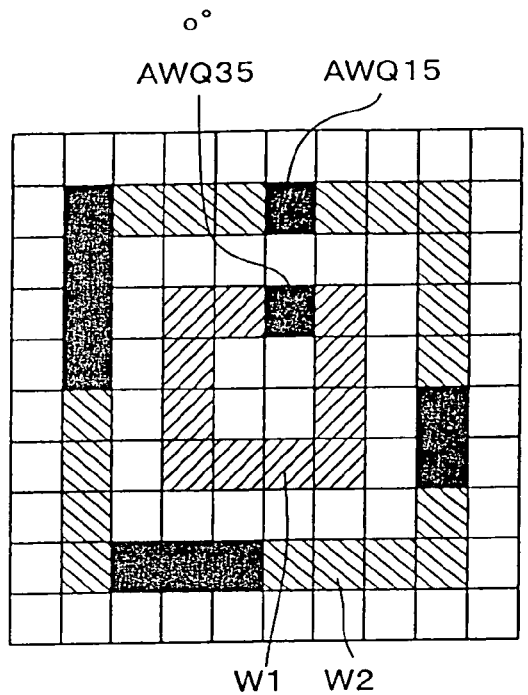
FIG. 19 shows examples of outputs of the pattern window.
Figure 19:
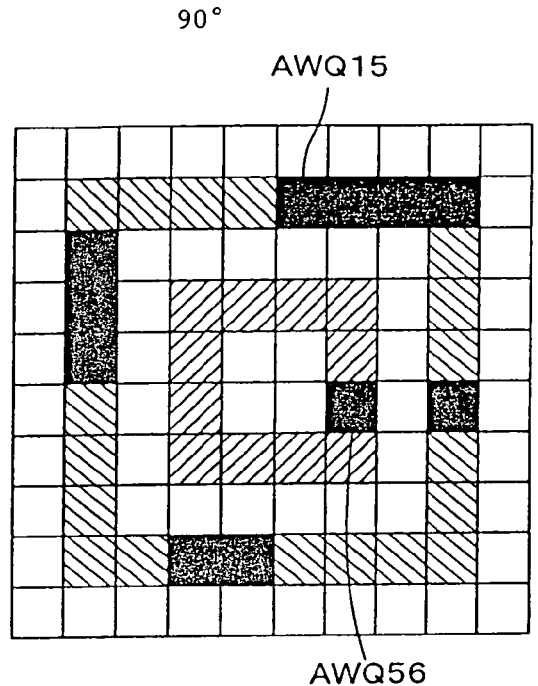
Figure 19:
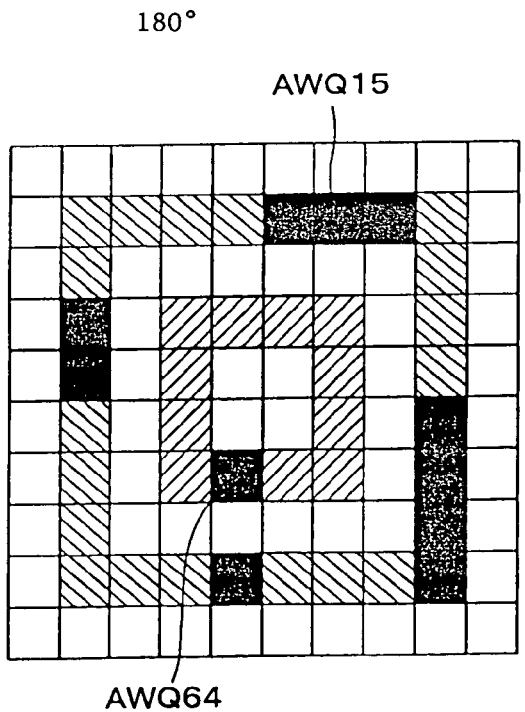
Figure 19:
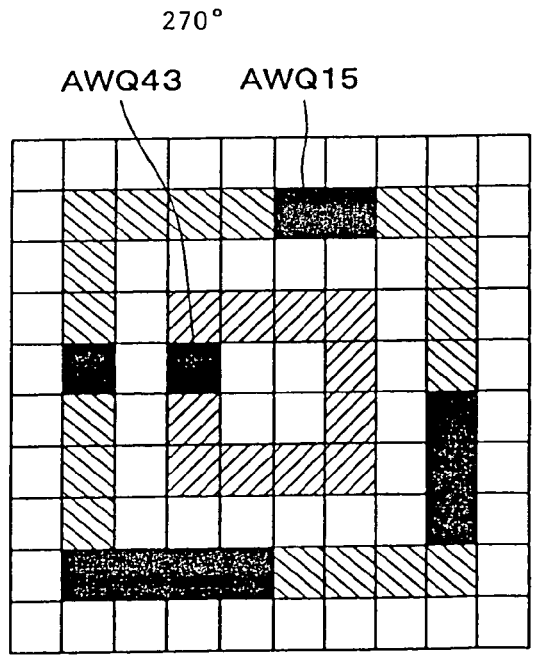
Figure 20:
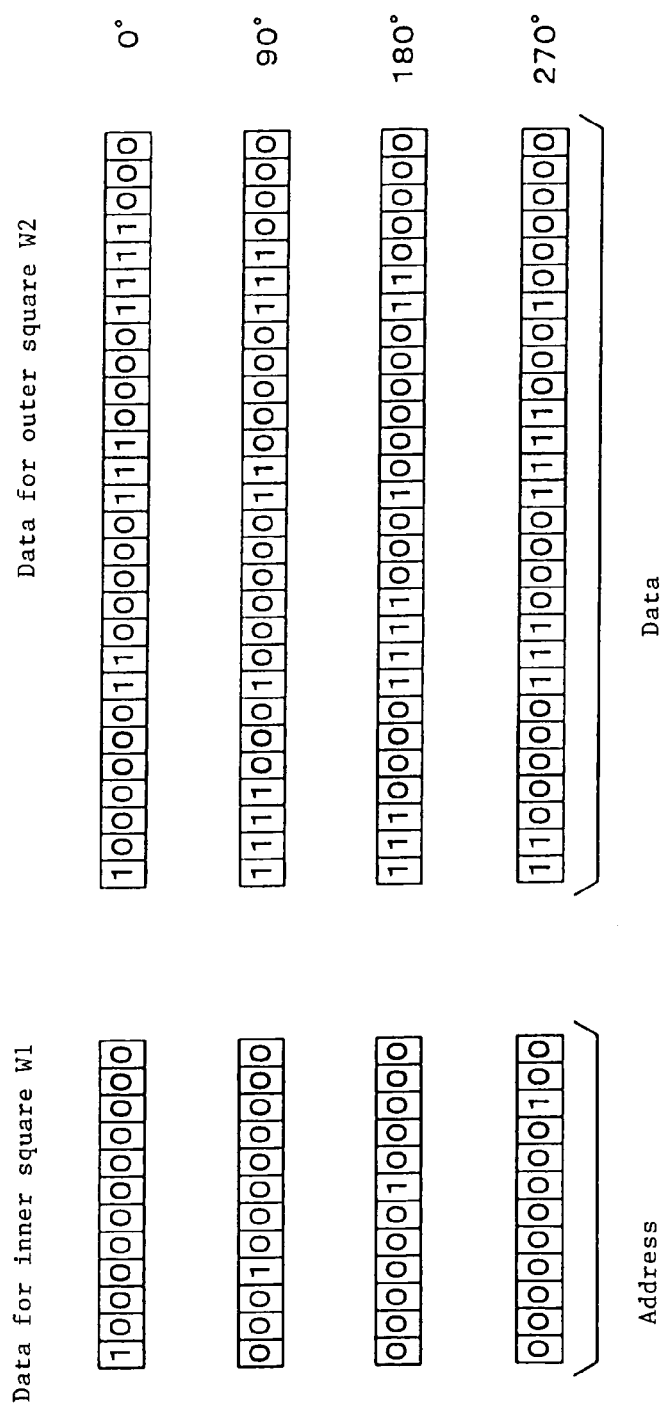
FIG. 20 shows data and addresses stored in dictionary storage unit, the memory for the outer square.

Generally when a document is copied, it must be placed parallel to the sides of the glass. Although the document may be parallel, it sometimes happens that it has been placed on the glass with its top and bottom or left and right sides reversed. Thus a target pattern on a document may be oriented in any one of four directions, as shown in FIGS. 19 (A) through (D). When the marks 2 constituting target pattern 1 are stored in a specified area of second memory unit 46, the data latched in latching circuits 47*b* and 47*c* by way of latching unit 47*a* are arranged in four ways, as shown in FIG. 20.

The data arrangement is stipulated in this way, and the relationship of the data latched by a mark on inner square $W_1$ at a given angle of rotation to the data latched by a mark on outer square $W_2$ is one to one. If the marks have been arranged appropriately, the data will be different at the four angles of rotation shown in FIGS. 19 and 20. If we find a match while trying to determine which data arrangement a certain region (in this example, inner square $W_1$, which has fewer data) corresponds to, there is a high probability that we have found the target pattern. Since we now know its angle of rotation, we can use the data latched from outer square $W_2$ as reference values (i.e., data which are valid if this is the target pattern). We compare these reference values with the actual data obtained from outer square $W_2$. A high coincidence indicates that the pattern has been recognized. Pattern location matching unit 47 uses this same principle.

In this embodiment, efficient use is made of the data from inner square $W_1$ and outer square $W_2$. As discussed above, the less voluminous data from inner square $W_1$ are used as addresses. The data strings in the units in FIG. 20 are stored at specified addresses in outer dictionary storage unit 47*e*.

The data latched by the circuit for the inner square, 47*c*, are used as addresses. If there is a match with one of the four addresses shown in FIG. 20, the data stored in outer dictionary storage unit (ROM) 47*e* which correspond to this address are read out and compared by comparison circuit 47*f*. By checking whether there is an address which corresponds to the mark data on inner square $W_1$, we determine whether the marks we have found are arranged in target pattern 1. Comparing the mark data on outer square $W_2$ with reference values which have been read out also allows us to determine whether the marks we have found are arranged in target pattern 1.

Comparison circuit 47*f* is composed of D latch unit $D_1$, which stores the data collected from the outer square; D latch unit $D_2$, which stores the dictionary data (i.e., the reference data) it receives from outer dictionary storage unit 47*e* for the outer square at specified angles of rotation; a dual-input coincidence circuit CC, which compares the data stored in latches $D_1$ and $D_2$; and parallel input-series output shift register SR, which receives each output of coincidence circuit CC and outputs it in the same order. Units $D_1$, $D_2$, CC and SR each have 28 stages to correspond to the number of data (28) comprising outer square $W_2$.

When this configuration is used, the data transmitted by latching circuit 47*b* and those received from dictionary storage unit 47*e* (the reference data) are stored in their respective latching units, $D_1$ and $D_2$. They are input into coincidence circuit CC in response to a specified timing signal. If the reference data and the data indicating the actual locations where the marks are extracted are identical, the output of coincidence circuit CC will go to "1". If they are not, it will go to "0". The result of this determination is stored in the corresponding shift register SR. A shift clock is applied to shift register SR, and the data stored in it are input to counter circuit 47*g* in order, bit by bit.

Counter circuit 47*g* counts the number of data which are "1". If all the data acquired from outer square $W_2$ coincide with the reference data stored in the dictionary, the 28 bits output by the shift register will all be "1". If none of them coincide, the 28 bits will all be "0". The higher the count value, then, the higher the goodness of fit of the data to the target pattern. In this example, the count value is the goodness of fit of the detected pattern with respect to the target pattern. When the goodness of fit exceeded a predetermined threshold value, it would judge the document to be non-reproducible and output a signal indicating detection of the target pattern.

In this example, four outer dictionary storage units corresponding to four angles when the document is aligned to the line of scanning stand. More dictionaries can be prepared for more detailed rotation of the document.

We will now explain the essential part of this invention. From the goodness of fit it receives from output unit 48, data synthesizing unit 14 determines whether to synthesize another set of data. Based on the position data from second memory unit 46 and pattern location matching unit 47, it synthesizes target pattern 1 and marks 2 in the original image from storage unit 20. These synthesized data represent an enhanced version of the target pattern. Concrete examples are given below.

This synthesis may, for example, can create the marks whose color saturation has been maximized (to FF). If the threshold value is, say, 80, and the density of the marks comprising the target pattern in the image which is read is 85, the marks will be recognized when the image is read, but they can be eliminated through subsequent processing. In particular, when marks have a density near the threshold value, as in the example above, they can readily be eliminated.

By increasing the density of the appropriate pixels to FF, we give them a density value far greater than the threshold. They can no longer be eliminated through subsequent image processing, and they will be certain to be detected in the final image recognition processing.

Figure 21:
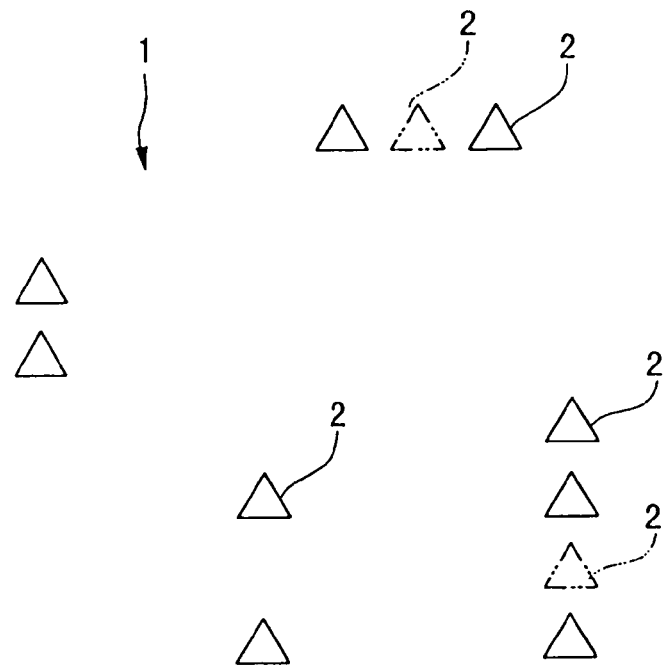
FIG. 21 (*a*) shows an example of the detected pattern.
Figure 21:
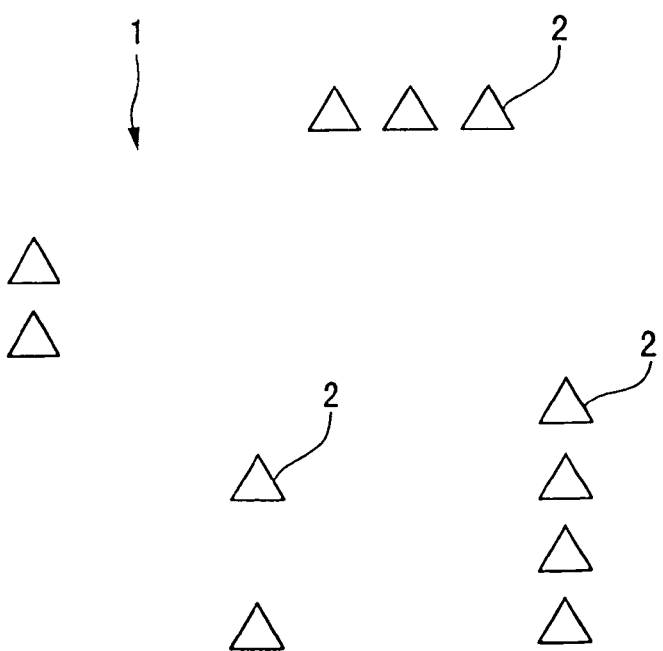

As can be seen in FIG. 21 (*a*), if the pattern which is recognized is missing a mark where one is supposed to be (the marks drawn in broken lines indicate places where marks are missing), a perfect pattern with no missing marks can be synthesized, as is shown in FIG. 21 (*b*).

If the density is to be increased as described above, two alternatives may be used. One is to enhance only some of the marks which have been detected. Suppose that a pattern like that shown in FIG. 21 (*a*) is detected. Here the first option would be to maximize the density of only those pixels comprising the marks 2 which were detected, i.e., those shown by solid lines, so that the overall pattern itself would still be defective. The second option would be to fix the target pattern as shown in FIG. 21 (*b*) by maximizing the density of all the pixels comprising each of the marks.

Figure 22:
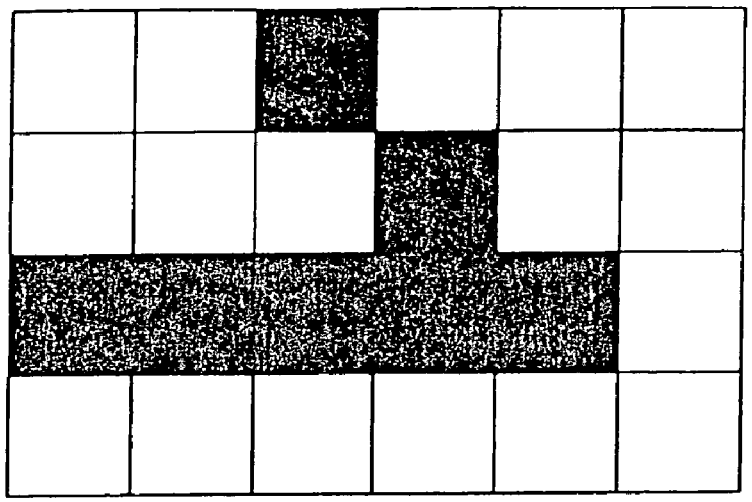
FIG. 22 (*a*) shows an example of the detected mark.
Figure 22:
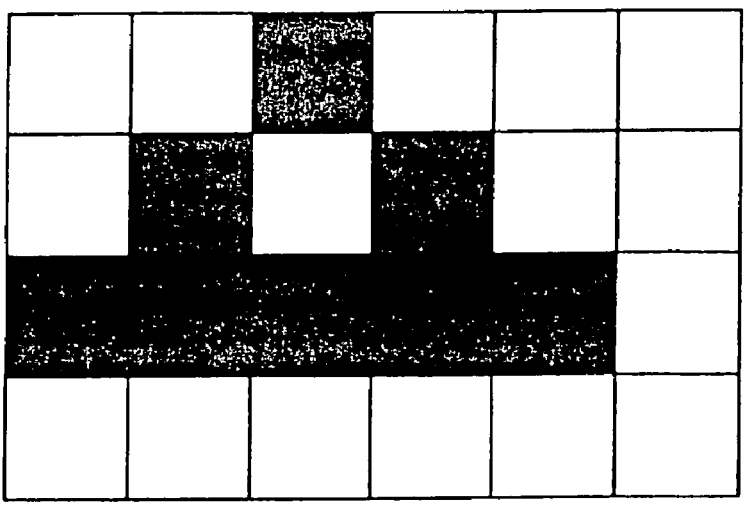

In this embodiment, the precise state of each pixel comprising each mark is not stored with the location of the mark. If it were, and some of the pixels were missing, as in FIG. 22 (*a*), we would have the option of regenerating the image as we found it (i.e., maximizing the density of those pixels which had been detected while ignoring the missing pixels, as in FIG. 22 (*a*)) or restoring the pattern to its proper condition with no missing pixels, as in FIG. 22 (*b*).

In the embodiment we have been discussing, the target pattern 1 that is in the original image is synthesized; however, the invention is not limited to this approach only. It would be equally acceptable, for example, to synthesize data constituting an electronic watermark. If this were to be done, the configuration would need to be that shown in FIG. 4. Data associated with the electronic watermark would be stored in data synthesizing unit 14. When the goodness of fit received from goodness of fit output unit 48 exceeded a threshold value, an electronic watermark based on the stored watermark data could be inserted into the image data which had been read.

If an electronic watermark is to be synthesized, there is no particular reason that it must be synthesized in the exact location of target pattern 1 in the image data. In this case, then, third memory unit 49 may be dispensed with. Since the principle underlying an electronic watermark and the method used to synthesize it involve technology which is well known in the prior art, we shall not present a detailed explanation here.

The image processing and image generating devices which receive electronic data from the image input device do not need the sorts of image recognition units discussed above, since they need to read only the data which represent the electronic watermark. Thus this method has the effect that the size of the recognition unit and the load imposed on it will be smaller.

In all of the embodiments and modified examples discussed above, the processing unit in the image input device (i.e., the device which reads the image) has consisted of hardware. It would, of course, be equally acceptable to realize this unit through software. Alternatively, the image input unit (the image reader) could be eliminated altogether and its function realized within an image processing device such as a personal computer.

As has been discussed, each of these embodiments makes the target data on the original document easier to distinguish when the data are input into an image generating device (i.e., a printer). This prevents documents from being copied illegally.

As has been described above, with the image processing and input devices according to this invention, targeted features are recognized when the image is read in. These features are enhanced so that they will be more difficult to eliminate through subsequent image processing. As a result, the features will be easier to recognize when the image is to be generated by an image generating device.

In particular, if the device is configured as described in claim 2, an enhanced version of the target pattern will be superimposed on the original pattern. The result will be a pattern indistinguishable to the human eye which, even if seen, will not be noticed. If the device is configured as described in claim 3, digital data will be added which can be detected with great accuracy in subsequent recognition processing. The use of digital data makes it much easier to determine that the detected pattern is the target pattern.

What is claimed is:

1. An image processing device to process received data and to determine whether said received data includes restricted data which is restricted from being reproduced, the image processing device comprising:

an image recognition unit for recognizing a degraded candidate pattern in said received data, wherein said degraded candidate pattern resembles a target pattern included in said restricted data; and a data synthesizing unit for reinforcing said degraded candidate pattern to be a substantial duplicate of said target pattern, wherein said reinforced candidate pattern is formed by superimposing said target pattern on said degraded candidate pattern.

2. An image processing device according to claim 1, wherein said data synthesizing unit reinforces said candidate pattern when there exists a predetermined degree of similarity between said candidate pattern and said target pattern.

3. An image processing device according to claim 1, wherein said reinforced candidate pattern is in the form of digital data.

4. An image processing device according to claim 3, wherein said digital data is an electronic watermark.

5. An image processing device according to claim 1, wherein said image processing device is a printer.

6. An image input device for receiving at an input a given image and for determining whether said given image includes restricted data which is restricted from being reproduced, the image input device comprising:

an image recognition unit for recognizing a degraded candidate pattern on said given image, wherein said degraded candidate pattern resembles a target pattern included in said restricted data; and a data synthesizing unit for reinforcing said degraded candidate pattern to be a substantial duplicate of said target pattern, wherein said reinforced candidate pattern is formed by superimposing said target pattern on said degraded candidate pattern.

7. An image input device according to claim 6, wherein said image input device converts said given image to digital data.

8. An image input device according to claim 7, wherein said image input device is a scanner.

9. An image processing method for processing received data and determining whether said received data includes restricted data which is restricted from being reproduced, the method comprising:

recognizing a degraded candidate pattern in said received data, wherein said degraded candidate pattern resembles a target pattern included in restricted data; and reinforcing said degraded candidate pattern to be a substantial duplicate of said target pattern by superimposing said target pattern on said degraded candidate pattern.

* * * * *